(12) United States Patent
Oh et al.

(10) Patent No.: US 11,914,564 B1
(45) Date of Patent: Feb. 27, 2024

(54) MERKLE TREE-BASED DATA MANAGEMENT METHOD AND APPARATUS

(71) Applicant: Penta Security Inc., Seoul (KR)

(72) Inventors: Jin Hyeok Oh, Gwangmyeong-si (KR); Keon Yun, Seoul (KR); Sun Woo Yun, Goyang-si (KR); Sang Min Lee, Seoul (KR); Jun Yong Lee, Namyangju-si (KR); Sang Gyoo Sim, Seoul (KR); Tae Gyun Kim, Yongin-si (KR)

(73) Assignee: Penta Security Inc., Seoul (KR)

( * ) Notice: Subject to any disclaimer, the term of this patent is extended or adjusted under 35 U.S.C. 154(b) by 0 days.

(21) Appl. No.: 18/059,897

(22) Filed: Nov. 29, 2022

(30) Foreign Application Priority Data

Nov. 11, 2022 (KR) .......................... 10-2022-0150607

(51) Int. Cl.
*G06F 16/22* (2019.01)
(52) U.S. Cl.
CPC ................................. *G06F 16/2246* (2019.01)
(58) Field of Classification Search
CPC ............. G06F 16/2246; G06F 16/2255; G06F 16/2264

See application file for complete search history.

(56) References Cited

U.S. PATENT DOCUMENTS

| | | | | |
|---|---|---|---|---|
| 2021/0012282 A1* | 1/2021 | Smith | ................. | G06F 16/2379 |
| 2023/0186293 A1* | 6/2023 | Dolev | ................... | H04L 9/0869 |
| | | | | 705/75 |

FOREIGN PATENT DOCUMENTS

| | | |
|---|---|---|
| KR | 10-1786006 B1 | 10/2017 |
| KR | 10-2453076 B1 | 10/2022 |

* cited by examiner

*Primary Examiner* — Loc Tran
(74) *Attorney, Agent, or Firm* — BROADVIEW IP LAW, PC (57) ABSTRACT

A Merkle tree-based data management method may comprise: aligning data into two-dimensional square matrix; calculating a hash value of each node of the two-dimensional square matrix; calculating hash values of each row of the two-dimensional square matrix; generating an additional column with nodes having the hash values of each row; calculating hash values of each column of the two-dimensional square matrix; generating an additional row with nodes having hash values of each column; and calculating a Merkle root by concatenating the hash values of the additional column and the hash values of the additional row.

13 Claims, 11 Drawing Sheets

MERKLE TREE-BASED DATA MANAGEMENT METHOD AND APPARATUS

CROSS-REFERENCE TO RELATED APPLICATIONS

This application claims priority to Korean Patent Application No. 10-2022-0150607, filed on Nov. 11, 2022 with the Korean Intellectual Property Office (KIPO), the entire contents of which are hereby incorporated by reference.

BACKGROUND

1. Technical Field

The present disclosure relates to a data management technology based on a Merkle tree, and more specifically, to a Merkle tree-based data management method and apparatus characterized by defining a new method for generating a Merkle tree using a two-dimensional Merkle tree structure, verifying data integrity based on the generated Merkle tree, and managing data using calculated hash values of data.

2. Related Art

A Merkle tree is a tree in the form of a binary tree and refers to a tree in which the values of all nodes are hash values. By creating and verifying the Merkle tree for data, the integrity of the data can be verified.

Figure 1:
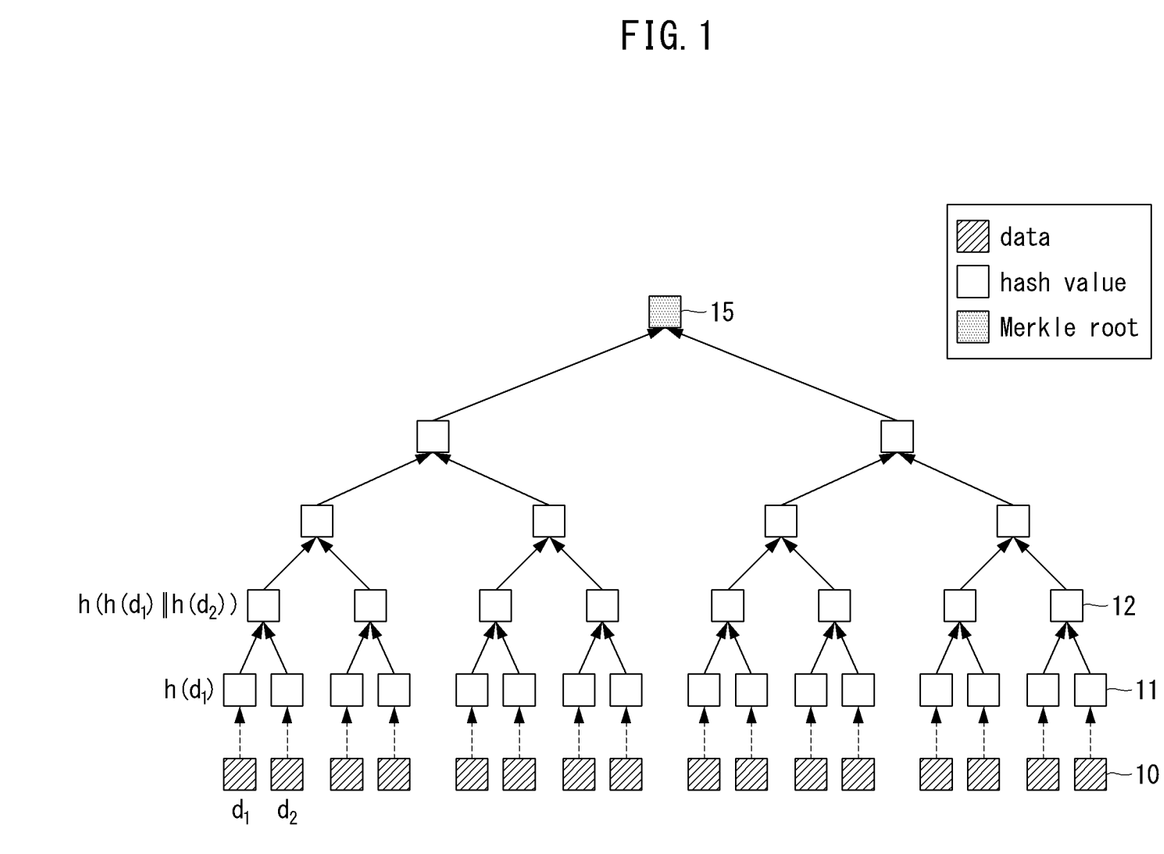
FIG. 1 is an exemplary diagram illustrating a conventional method of generating a Merkle tree.

As shown in FIG. 1, the existing Merkle tree generation method generates a Merkle tree by way of calculating hash values 11 of data ($d_1$, $d_2$, etc.), which are the lowest nodes 10 constituting the Merkle tree, calculating hash values 12 of the upper nodes by concatenating the calculated hash values by 2, and repeating this to calculate a Merkle root 15. In the calculation of the concatenated hash values, for example, the first hash value $h(d_1)$ and the second hash value $h(d_2)$ are concatenated to produce the third hash value $h(h(d_1)\|h(d_2))$ for the upper node. In this case, when generating a Merkle tree for $N(=2^n)$ pieces of data, the total amount of hash function calculation becomes $2N-1$.

Figure 2:
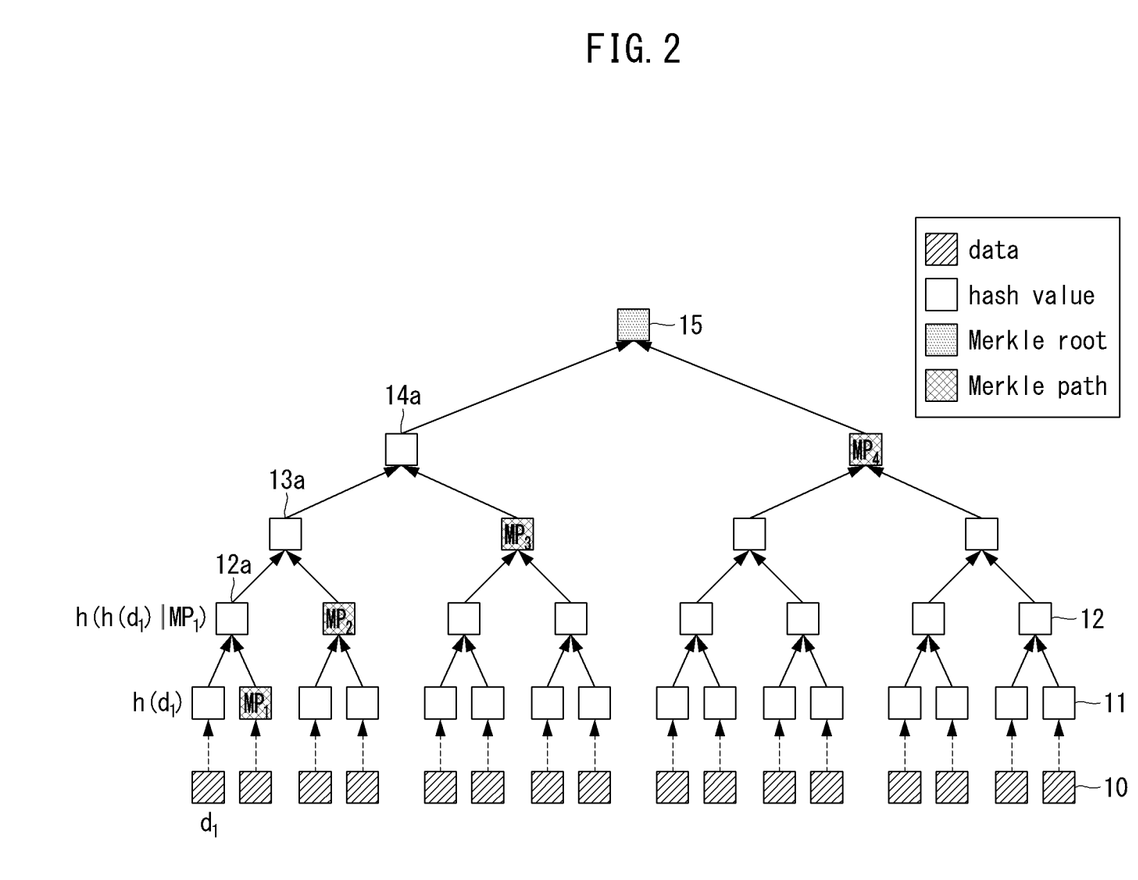
FIG. 2 is a diagram for describing an integrity verification method using the Merkle tree of FIG. 1.

Meanwhile, as shown in FIG. 2, the existing Merkle tree-based data integrity verification method verifies the data integrity by way of preparing a Merkle path and a Merkle root in the Merkle tree of the data to be verified, obtaining the first hash values ($h(d_1)$) 11 of the first node ($d_1$), and obtaining the second has value 12a by concatenating the first has value 11 and the first Merkle path $MP_1$. In this case, the second hash value is expressed as $h(h(d_1)|MP_1)$. In addition, after obtaining the Merkle root 15 by way of calculating the third hash value 13a by concatenating the second hash value 12a and the second Merkle path $MP_2$, calculating the fourth hash value 14a by concatenating the third hash value 13a and the third Merkle path $MP_3$, and calculating the Merkle root 15 by concatenating the fourth has value 14a and the fourth Merkle path $MP_4$, the integrity of the data is verified by comparing the calculated Merkle root with the previously prepared Merkle root.

In the existing Merkle tree-based data integrity verification method, when the total number of data (N) is $2^n$, the total amount of the hash function calculation for integrity verification on one data becomes $\log_2^N+1$.

Meanwhile, there is currently no way to manage the data constituting a Merkle tree or to effectively perform data integrity verification, while reducing the total amount of hash function calculation, through such a data management method.

SUMMARY

The present disclosure has been conceived to solve the problems of conventional technology, and it is an object to provide a Merkle tree-based data management method and apparatus capable of managing data constituting a Merkle tree by way of defining a new method for generating a Merkle tree using a two-dimensional Merkle tree structure, verifying data integrity based on the generated Merkle tree, and managing the data using the calculated hash values.

According to a first exemplary embodiment of the present disclosure, a Merkle tree-based data management method may comprise: aligning data into two-dimensional square matrix; calculating a hash value of each node of the two-dimensional square matrix; calculating hash values of each row of the two-dimensional square matrix; generating an additional column with nodes having the hash values of each row; calculating hash values of each column of the two-dimensional square matrix; generating an additional row with nodes having hash values of each column; and calculating a Merkle root by concatenating the hash values of the additional column and the hash values of the additional row.

The method may further comprise: calculating a value of last M bits (M is an arbitrary natural number equal to or greater than 2) of the hash value pre-calculated for the data; filling the calculated M-bit result value into a Merkle tree generation queue; and generating a Merkle tree upon the Merkle tree generation queue being completely filled.

The method may further comprise verifying integrity of verification target data using the Merkle tree.

The method may further comprise: obtaining a Merkle path and an original Merkle root for verification target data; calculating a hash value for the verification target data; calculating hash values of the additional row and the additional column by concatenating the calculated hash value with Merkle path values of each row and each column of the pre-generated two-dimensional square matrix; calculating the Merkle root by concatenating the hash values of the additional row and the additional column; and verifying integrity of the verification target data by comparing the calculated Merkle root with the original Merkle root.

According to a second exemplary embodiment of the present disclosure, a Merkle tree-based data management method may comprise: obtaining a Merkle path and an original Merkle root for verification target data; calculating a hash value for the verification target data; calculating hash values of an additional row and an additional column by concatenating the hash value with Merkle path values of each row and each column of a pre-generated two-dimensional square matrix based on the hash value; calculating a Merkle root by concatenating the hash values of the additional row and the additional column; and verifying integrity of the verification target data by comparing the calculated Merkle root with the original Merkle root.

The obtaining the Merkle path and an original Merkle root may comprise: requesting the Merkle path and the original Merkle root for the verification target data from a Merkle tree generator; and receiving the Merkle path and the original Merkle root form the Merkle tree generator.

The method may further comprise generating the two-dimensional square matrix before calculating the hash value, wherein generating the two-dimensional square matrix comprises: aligning the verification target data in a basic form of the two-dimensional square matrix; calculating a hash value of each node of the two-dimensional square matrix; calculating hash values of each row of the two-dimensional square matrix; generating an additional column with nodes having the hash values of each row; calculating hash values of each column of the two-dimensional square matrix; and generating an additional row with nodes having the hash values of each column.

According to a third exemplary embodiment of the present disclosure, a Merkle tree-based data management method may comprise: aligning data into a two-dimensional square matrix; calculating a hash value of each node of the two-dimensional square matrix; calculating hash values of each row of the two-dimensional square matrix; generating an additional column with nodes having the hash values of each row; calculating hash values of each column of the two-dimensional square matrix; generating an additional row with nodes having hash values of each column; calculating an original Merkle root by concatenating the hash values of the additional column and the hash values of the additional row; obtaining a Merkle path and the original Merkle root for verification target data, the Merkle path representing a pre-calculated hash value of a specific node among the nodes of the two-dimensional square matrix; calculating hash values for verification target data aligned in the two-dimensional square matrix; calculating each hash value of a specific column in an additional row and a specific row in an additional column by concatenating the hash value of an arbitrary node of the two-dimensional square matrix and Merkle path values of remaining nodes of the specific row and the specific column including the arbitrary node; calculating a Merkle root by concatenating the hash value of a specific column of the additional row with the Merkle path values of the remaining nodes of the additional row and concatenating the hash value of the specific row of the additional column with the Merkle path values of the remaining nodes of the additional column; and verifying the integrity of the verification target data by comparing the calculated Merkle root with the original Merkle root.

The method may further comprise: calculating a value of the last M bits (M is an arbitrary natural number equal to or greater than 2) of the hash value pre-calculated for the data; filling the calculated M-bit result value into a Merkle tree generation queue; and generating a Merkle tree upon the Merkle tree generation queue being completely filled.

The method may further comprise processing, in response to a duplicate of the M-bit result value while filling the calculated M-bit result value into the Merkle tree generation queue in a data index matching method, to fill the corresponding value into a next Merkle tree generation queue.

According to a third exemplary embodiment of the present disclosure, a data management apparatus may comprise: at least one processor performing Merkle tree-based data management with a program or at least one instructions stored in a memory, wherein the processor is configured to perform aligning data into two-dimensional square matrix, calculating a hash value of each node of the two-dimensional square matrix, calculating hash values of each row of the two-dimensional square matrix, generating an additional column with nodes having the hash values of each row, calculating hash values of each column of the two-dimensional square matrix, generating an additional row with nodes having hash values of each column, and calculating a Merkle root by concatenating the hash values of the additional column and the hash values of the additional row.

The processor may be further configured to perform calculating a value of the last M bits (M is an arbitrary natural number equal to or greater than 2) of the hash value pre-calculated for the data, filling the calculated M-bit result value into a Merkle tree generation queue, and generating a Merkle tree upon the Merkle tree generation queue being completely filled.

The processor may be further configured to perform verifying the integrity of verification target data using the Merkle tree.

The processor may be further configured to perform obtaining a Merkle path and an original Merkle root for verification target data, calculating a hash value for the verification target data, calculating hash values of the additional row and the additional column by concatenating the calculated hash value with Merkle path values of each row and each column of the pre-generated two-dimensional square matrix, calculating the Merkle root by concatenating the hash values of the additional row and the additional column, and verifying the integrity of the verification target data by comparing the calculated Merkle root with the original Merkle root.

According to a third exemplary embodiment of the present disclosure, a data management apparatus may comprise: at least one processor performing Merkle tree-based data management with a program or at least one instruction stored in memory, wherein the processor is configured to perform obtaining a Merkle path and an original Merkle root for verification target data, calculating a hash value for the verification target data, calculating hash values of an additional row and an additional column by concatenating the hash value with Merkle path values of each row and each column of a pre-generated two-dimensional square matrix based on the hash value, calculating a Merkle root by concatenating the hash values of the additional row and the additional column, and verifying the integrity of the verification target data by comparing the calculated Merkle root with the original Merkle root.

The processor may be further configured to perform requesting the Merkle path and the original Merkle root for the verification target data from a Merkle tree generator and receiving the Merkle path and the original Merkle root from the Merkle tree generator.

The processor may be further configured to perform generating the two-dimensional square matrix before calculating the hash value, wherein generating the two-dimensional square matrix comprises: aligning the verification target data in a basic form of the two-dimensional square matrix; calculating a hash value of each node of the two-dimensional square matrix; calculating hash values of each row of the two-dimensional square matrix; generating an additional column with nodes having the hash values of each row; calculating hash values of each column of the two-dimensional square matrix; and generating an additional row with nodes having the hash values of each column.

The present disclosure is advantageous in terms of providing a Merkle tree-based data management method and apparatus capable of managing data constituting a Merkle tree by way of defining a new method for generating a Merkle tree using a two-dimensional Merkle tree structure, verifying data integrity based on the generated Merkle tree, and managing the data using the calculated hash values.

The present disclosure is also advantageous in terms of providing a method for generating a Merkle tree of enormous size that is capable of improving the Merkle tree generation speed and reducing the memory usage by 50% compared to the existing Merkle tree structure.

The present disclosure is also advantageous in terms of providing a two-dimensional Merkle tree-based data integrity verification method capable of significantly reducing the amount of computation for the integrity verification hash function by executing only four hash functions during data integrity verification.

The present disclosure is also advantageous in terms of providing a two-dimensional Merkle tree-based data management method capable of efficiently managing data without increasing the amount of calculation by using the machine-calculated hash values of the data.

DETAILED DESCRIPTION OF THE EMBODIMENTS

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

Figure 3:
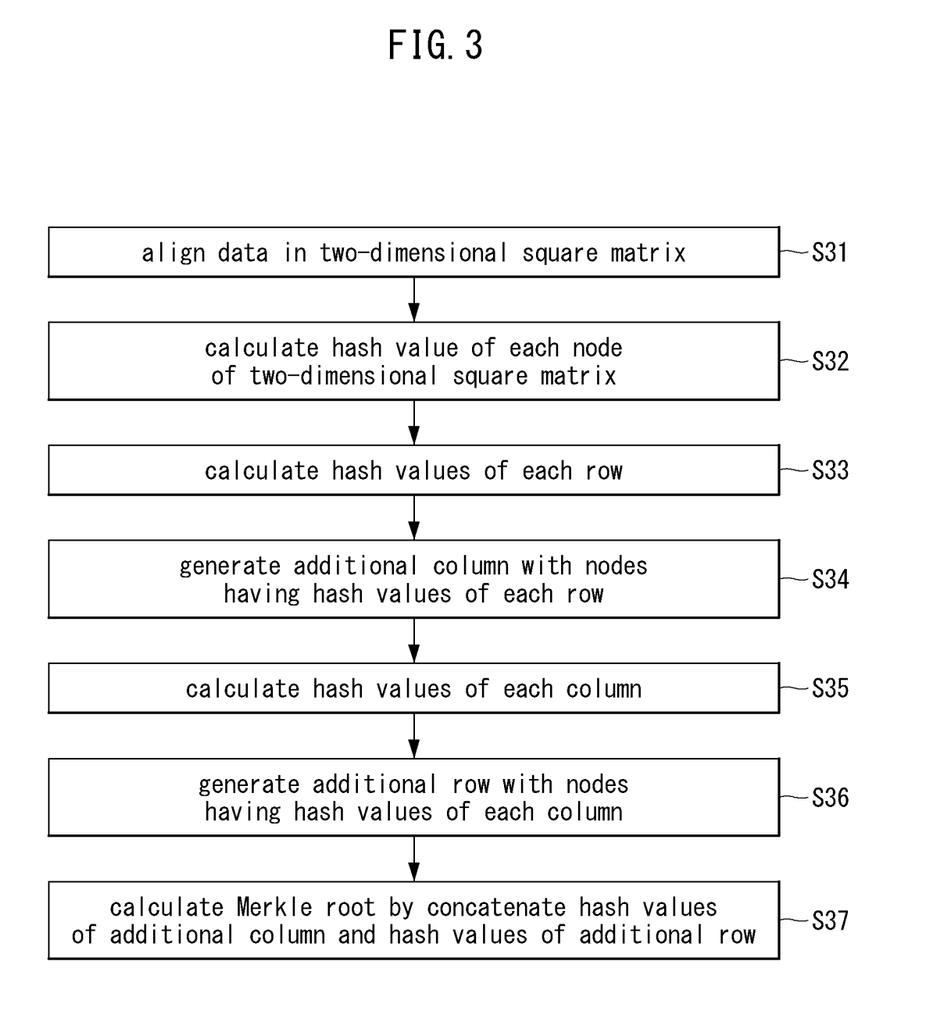
FIG. 3 is a flowchart illustrating a Merkle tree generation procedure that can be employed in a Merkle tree-based data management method according to an embodiment of the present disclosure.
Figure 4:
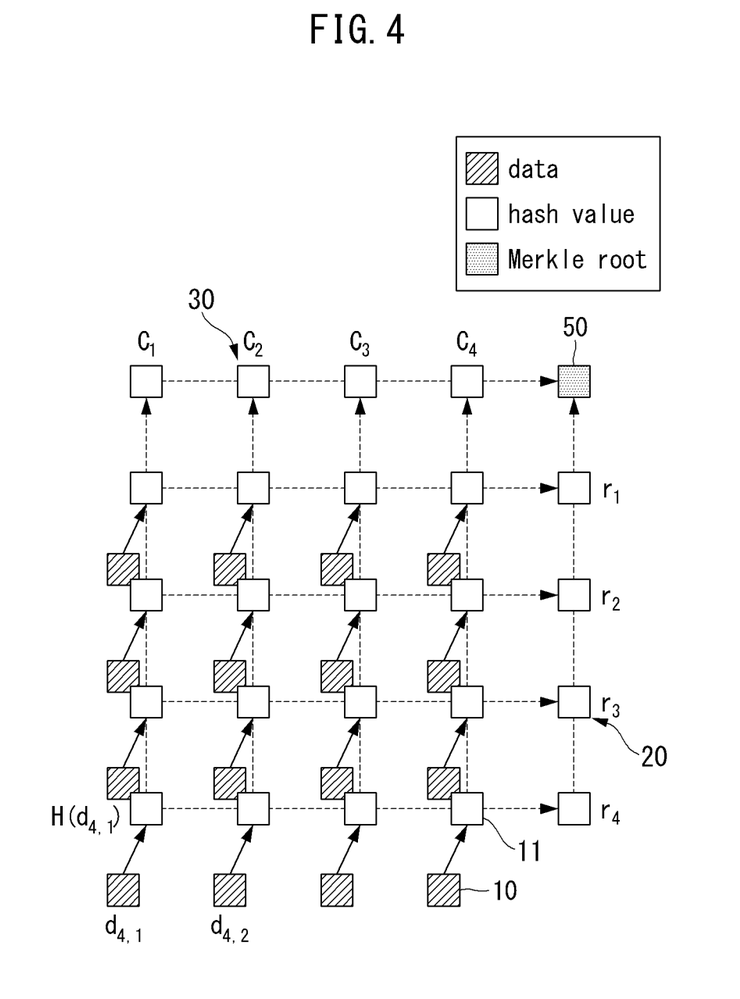
FIG. 4 is an exemplary diagram for explaining the Merkle tree generation procedure of FIG. 3.

FIG. 3 is a flowchart illustrating a Merkle tree generation procedure that can be employed in a Merkle tree-based data management method according to an embodiment of the present disclosure. FIG. 4 is an exemplary diagram for explaining the Merkle tree generation procedure of FIG. 3.

With reference to FIGS. 3 and 4, the Merkle tree-based data management apparatus may align, at step S31, the data 10 prepared or input in advance to generate the Merkle tree in a two-dimensional square matrix. The two-dimensional square matrix may be expressed as $2^n \times 2^n$. Here, n may be any natural number equal to or greater than 1. The data of each node aligned in the two-dimensional square matrix may be assigned an index according to the row and column of the two-dimensional square matrix, such as $d_{4,1}$ and $d_{4,2}$.

Next, the Merkle tree-based data management apparatus may calculate a hash value of each node 11 of the two-dimensional square matrix at step S32. For example, in a 4×4 matrix, the hash value for the node in row 4 and column 1 may be expressed as $H(d_{41})$.

Next, the Merkle tree-based data management apparatus may calculate hash values of each row of the two-dimensional square matrix at step S33. Then, the Merkle tree-based data management apparatus may create, at step S34, an additional column 20 with nodes having hash values of each row. The additional column 20 may include first to fourth row nodes $r_1$, $r_2$, $r_3$, and $r_4$ in a 4×4 matrix.

Next, the Merkle tree-based data management apparatus may calculate hash values of each column of the two-dimensional square matrix at step S35. Then, the Merkle tree-based data management apparatus may create, at step S36, an additional row 30 with nodes having hash values of each column. The additional row 30 may include first to fourth column nodes $c_1$, $c_2$, $c_3$, and $c_4$ in a 4×4 matrix.

Next, the Merkle tree-based data management apparatus may calculate, at step S37, the Merkle root 50 by concatenating the hash values of the additional column 20 and the hash values of the additional row 30. The hash values of the nodes of the additional column 20 are generalized and expressed as in Equation 1, the hash values of the nodes of the additional column 30 are generalized and expressed as in Equation 2, and the hash value of the Merkle root Ri 50 may be generalized as in Equation 3 and expressed.

$$r_i = h(h(d_{i,1}) \| h(d_{i,2}) \| \ldots \| h(d_{i,i})) \quad \text{[Equation 1]}$$

$$c_i = h(h(d_{1,i}) \| h(d_{2,i}) \| \ldots \| h(d_{i,i})) \quad \text{[Equation 2]}$$

$$R_i = h(r_1 \| r_2 \| \ldots \| r_i \| c_1 \| c_2 \| \ldots \| c_i) \quad \text{[Equation 3]}$$

According to this embodiment, a Merkle tree in a two-dimensional Merkle tree structure may be generated. Here, the Merkle tree is a tree in the form of a binary tree and refers to a tree in which all node values are hash values.

Merkle tree can be utilized for flood effect, high-speed integrity verification, storage space efficiency improvement, and popular system use. Here, the flood effect means that if even one block is forged or tampered with, the Merkle root is changed so as to detect forged or tampered blocks. The high-speed integrity verification means that it is possible to perform fast data integrity verification by generating a Merkle root through a Merkle path. The storage space efficiency improvement means that integrity verification can be performed effectively even in devices with insufficient space because integrity verification is possible without storing all blocks. And the popular system use means that it can be used for bitcoin, peer-to-peer (P2P) file transfer, etc.

In the case of generating a Merkle tree according to the Merkle tree generation method of this embodiment, when the total number of data N is $n^2$, the total hash calculation amount is $N+2\sqrt{N}+1$, which means that as the number of data (N) increases, the Merkle tree generation speed and memory efficiency may increase about twice the existing Merkle tree generation method.

The amount of calculation for generating a Merkle tree in the Merkle tree generation method of the present embodiment may be expressed as Equation 4 below.
[Equation 4]

$$\lim_{N \to \infty} \frac{N + 2\sqrt{N} + 1}{2N - 1} = \frac{1}{2}$$

According to Equation 1, it can be seen that the amount of calculation for generating the Merkle tree in this embodiment is 0.5 (½), which is very small compared to the existing Merkle tree generation calculation amount (2N−1), e.g., the Merkle tree generation calculation amount of 31 for 16 data in total.

Figure 5:
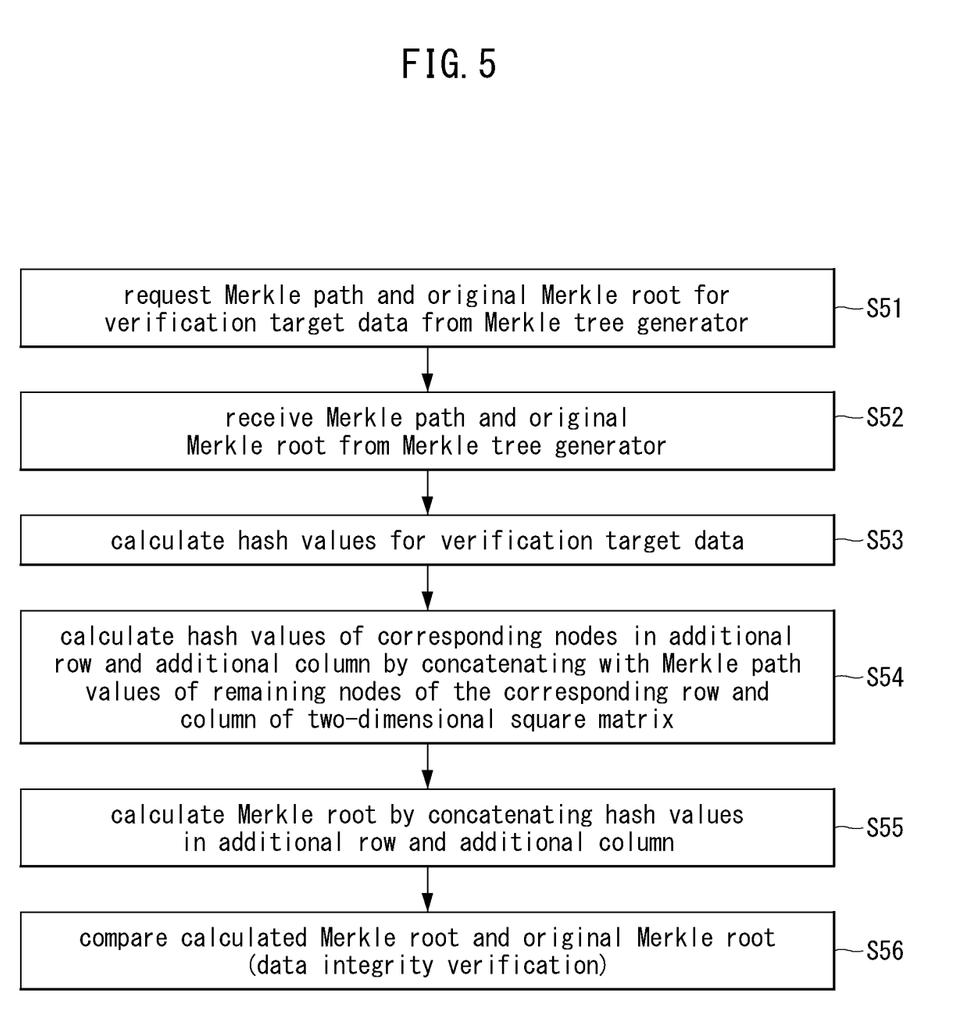
FIG. 5 is a flowchart illustrating a Merkle tree-based data integrity verification procedure that can be employed in a Merkle tree-based data management method according to another embodiment of the present disclosure.
Figure 6:
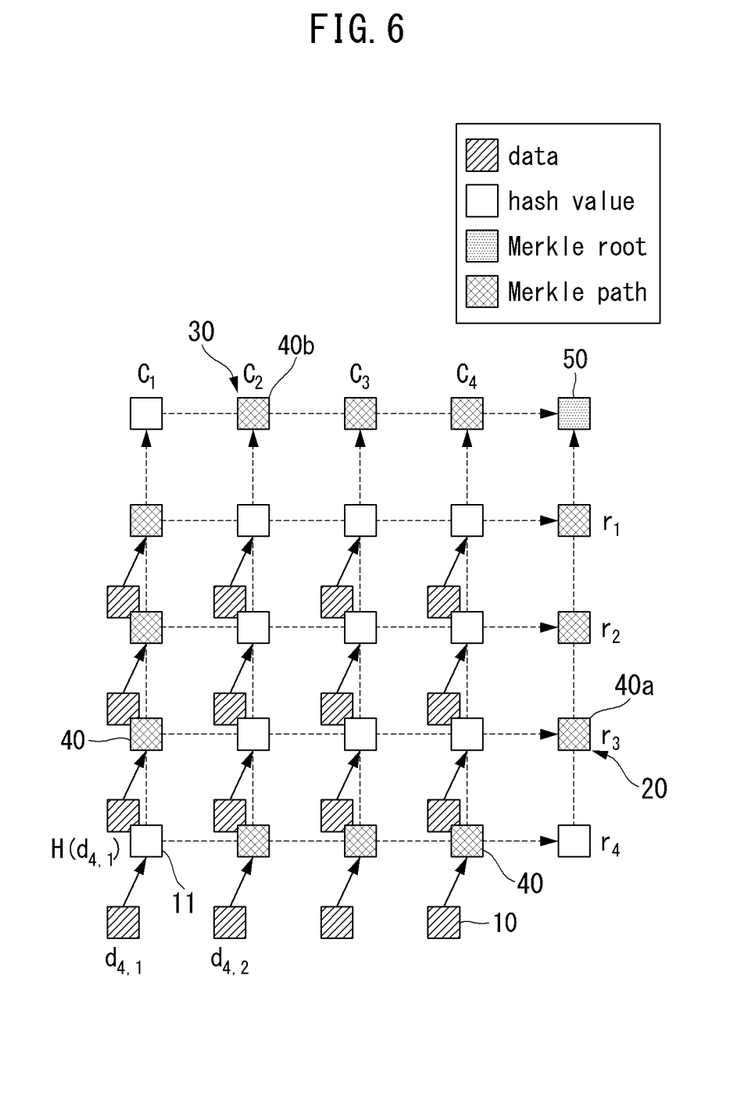
FIG. 6 is an exemplary diagram for explaining the data integrity verification procedure of FIG. 5.

FIG. 5 is a flowchart illustrating a Merkle tree-based data integrity verification procedure that can be employed in a Merkle tree-based data management method according to another embodiment of the present disclosure. FIG. 6 is an exemplary diagram for explaining the data integrity verification procedure of FIG. 5.

FIGS. 5 and 6, the Merkle tree-based data management apparatus may first acquire the Merkle paths 40, 40a, and 40b and the original Merkle root for verification target data for integrity verification. In order to verify the integrity of the data, the data management apparatus may extract the Merkle path 40, 40a, 40b corresponding to the pre-calculated hash value of a predetermined node and the pre-calculated Merkle root of the corresponding data as the original Merkle root from a storage means such as a memory.

As another method of acquiring the Merkle path and the Merkle root, the data management apparatus may also request, at step S51, the Merkle path 40, 40a, and 40b and the original Merkle root for the verification target data from a Merkle tree generator through a wired or wireless communication network and receive, at step S52, the Merkle path 40, 40a, and 40b and the original Merkle root from the Merkle tree generator.

Next, the data management apparatus may calculate a hash value for the verification target data at step S53. For example, when it is desired to verify the integrity of data of a specific node, e.g., the first node $d_{4,1}$ among the plurality of nodes 10 of the verification target data, the data management apparatus may calculate the first hash $(H(d_{4,1}))$ of the first node $d_{4,1}$.

Next, the data management apparatus may calculate, at step S54, the hash values of the corresponding node $r_4$ in the additional column (hereinafter simply referred to as 'additional column node') and the corresponding node $c_i$ in the additional row (hereinafter simply referred to as 'additional row node') by concatenating the first hash value 11 of the first node and the Merkle paths 40 as hash values of the remaining nodes in the corresponding row and column of the two-dimensional square matrix in which the first hash value 11 of the first node is located each other.

Next, the data management apparatus may calculate, at step S55, the Merkle root 50 by concatenating the hash value of the additional column node $r_4$ and the Merkle paths 40a that are hash values of the remaining nodes of the additional column and by concatenating the hash value of the node $c_1$ in the additional row and the Merkle paths 40b that are the hash values of the remaining nodes in the additional row. Through this process, it is possible to obtain the calculated Merkle root 50.

Next, the data management apparatus may verify the integrity of the verification target data by comparing the calculated Merkle root with the original Merkle root at step S56.

According to this embodiment, data integrity verification may be effectively performed based on the two-dimensional Merkle tree. That is, in the two-dimensional Merkle tree-based data management method, the amount of hash calculation required for integrity verification is 4 regardless of the total number of data (N). This means that the integrity verification speed is greatly improved compared to the amount of computation (refer to Equation 4) in the existing one-dimensional Merkle tree integrity verification.

That is, in the data integrity verification process of this embodiment, the hash function is used only to obtain the hash value of the verification target data, the hash value in the additional row of the corresponding data, the hash value in the additional column of the corresponding data, and the hash value of the Merkle root, which means that data integrity verification can be completed with a total of 4 hash calculations.

Meanwhile, although this embodiment exemplifies a case of verifying the integrity of the data of the first node $d_{4,1}$ using the first hash value $H(d_{4,1})$ of the first node $d_{4,1}$, the hash value of the additional column node $r_4$ in row 4 of the 4×4 matrix, the hash value of the additional row node $c_1$ in column 1 of the 4×4 matrix, and the hash value of Merkle Root 50, the present disclosure is not limited thereto, and the same can be applied to verify the integrity of the data of any node of a predetermined two-dimensional square matrix.

For example, the data management apparatus may use the second hash value $H(d_{4,2})$ of the second node $d_{4,2}$, the hash value of the additional column node $r_4$ in row 4 of the 4×4 matrix, the hash value of the additional row node $c_2$ in row 2 of the 4×4 matrix, and the hash value of Merkle Root 50 to verify the integrity of the data of the second node $d_{4,2}$. In this case, except the above four hash values, the remaining nodes in row 4, the remaining nodes in the column 2, and the remaining nodes of each additional column and additional row may be processed to have hash values obtained by Merkle paths.

According to this embodiment, it is possible to greatly reduce the amount of calculation of the hash function in verifying data integrity.

Figure 7:
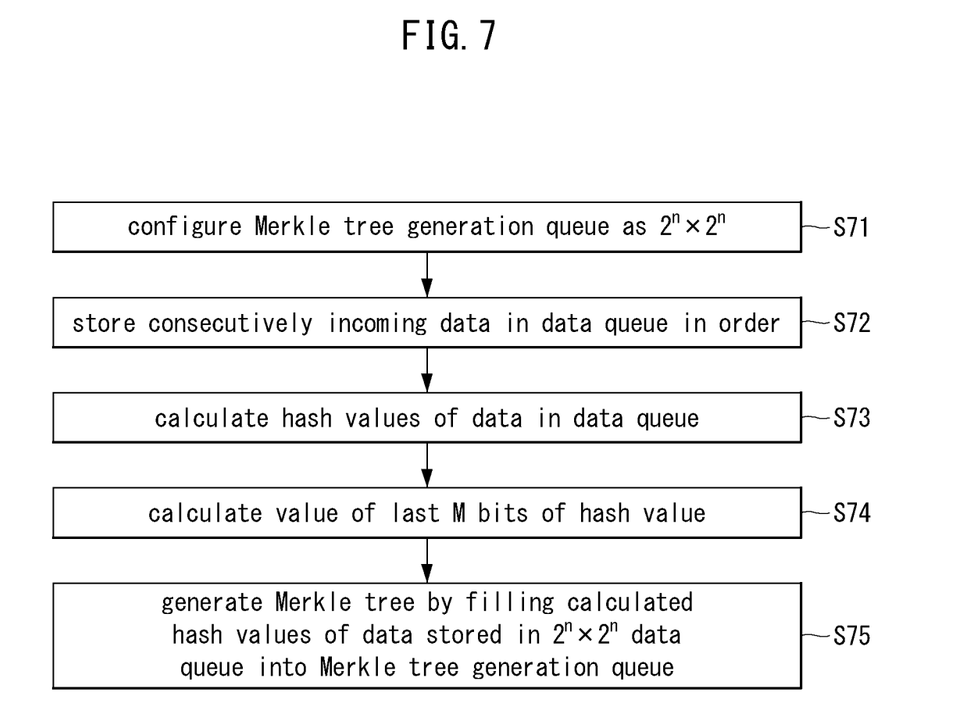
FIG. 7 is a flowchart of a Merkle tree-based data management procedure that can be employed in a Merkle tree-based data management method according to another embodiment of the present disclosure.
Figure 8:
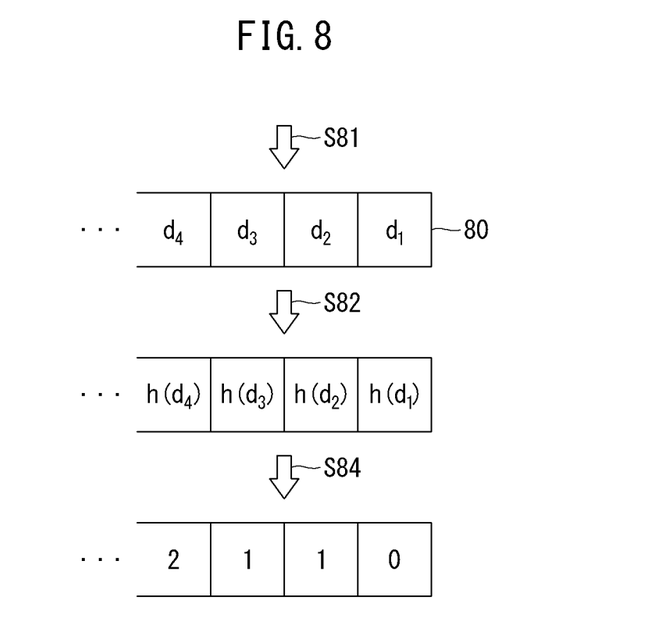
FIGS. 8 and 9 are exemplary diagrams for explaining the data management procedure of FIG. 7.
Figure 9:
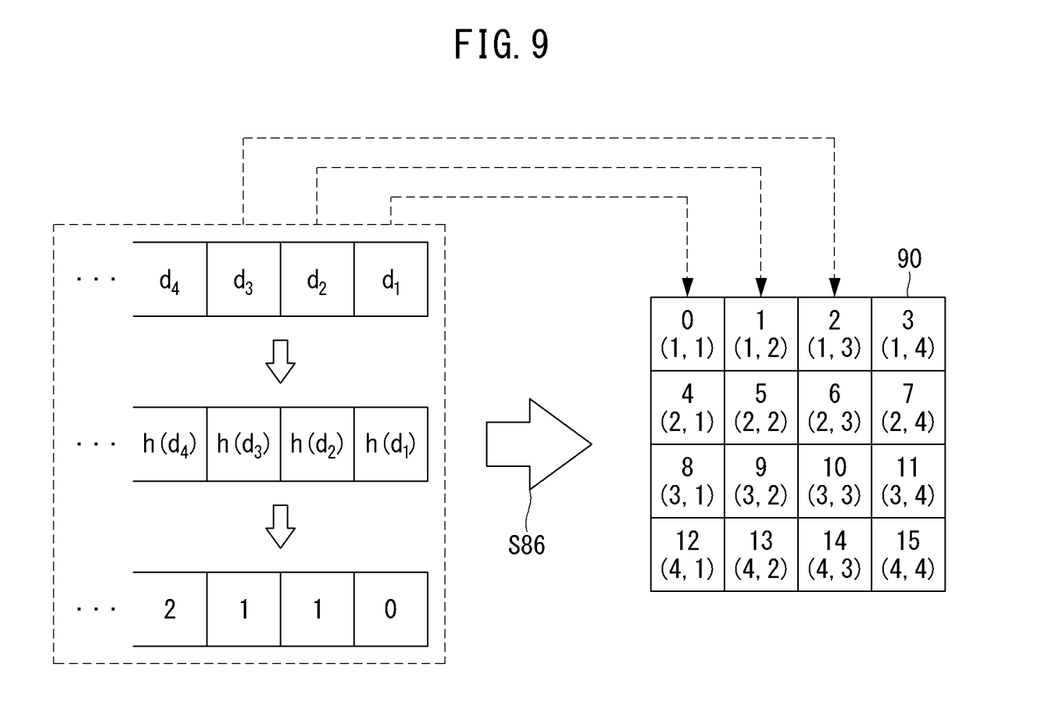

FIG. 7 is a flowchart of a Merkle tree-based data management procedure that can be employed in a Merkle tree-based data management method according to another embodiment of the present disclosure. FIGS. 8 and 9 are exemplary diagrams for explaining the data management procedure of FIG. 7.

With reference to FIGS. 7 to 9, the data management apparatus implementing the Merkle tree-based data management method may first configure or prepare the Merkle tree generation queue 90 of $2^n \times 2^n$ at step S71. Here, n is a natural number equal to or greater than 1.

Next, the data management apparatus may store consecutively incoming data $(d_1, d_2, d_3, d_4, \ldots)$ into the data queue 80 in order (S72 and S81).

Next, the data management apparatus may calculate hash values $(h(d_1), h(d_2), h(d_3), h(d_4), \ldots)$ of the data stored in the data queue 80 (step S73 and S82).

Next, the data management apparatus may calculate the value of the last M bits (M is an arbitrary natural number equal to or greater than 2) of each of the hash values (S74 and S84). When M=4, each data may be indexed with 16 values from 0th to 15th.

Next, the data management apparatus may fill the calculated M-bit result value into the Merkle tree generation queue 90 and generate, at step S75, a Merkle tree when the Merkle tree generation queue 90 is completely filled.

In the course of filling the Merkle tree generation queue 90 with the calculated M-bit result value using the data index matching method at step S86, when two consecutive result values are duplicated, the data management apparatus may process to fill one of the preceding result value and the succeeding result value into the next Merkle tree generation queue.

For example, assuming that the hash values of the first to fourth data $(d_1, d_2, d_3,$ and $d_4)$ stored in the data queue 80 are the first to fourth hash values $(h(d_1), h(d_2), h(d_3),$ and $h(d_4))$, the values of the last 4 bits of the hash values may have 0, 1, 1, and 2 in the order enumerated. In this case, when the result values are filled in the Merkle tree generation queue 90 in a predetermined order according to data index matching, e.g., from left to right and from top to bottom, the data management apparatus may operate to fill the 4-bit result value of 1 of the third hash value into the next Merkle tree generation queue, because the 4-bit result value of 1 of the second hash value and the 4-bit result value of 1 of the third hash value are the same. Of course, the data management apparatus may operate to fill the 4-bit result value of 1 of the second hash value into the next Merkle tree generation queue, instead of the 4-bit result value of 1 of the third hash value, depending on the implementation.

Figure 10:
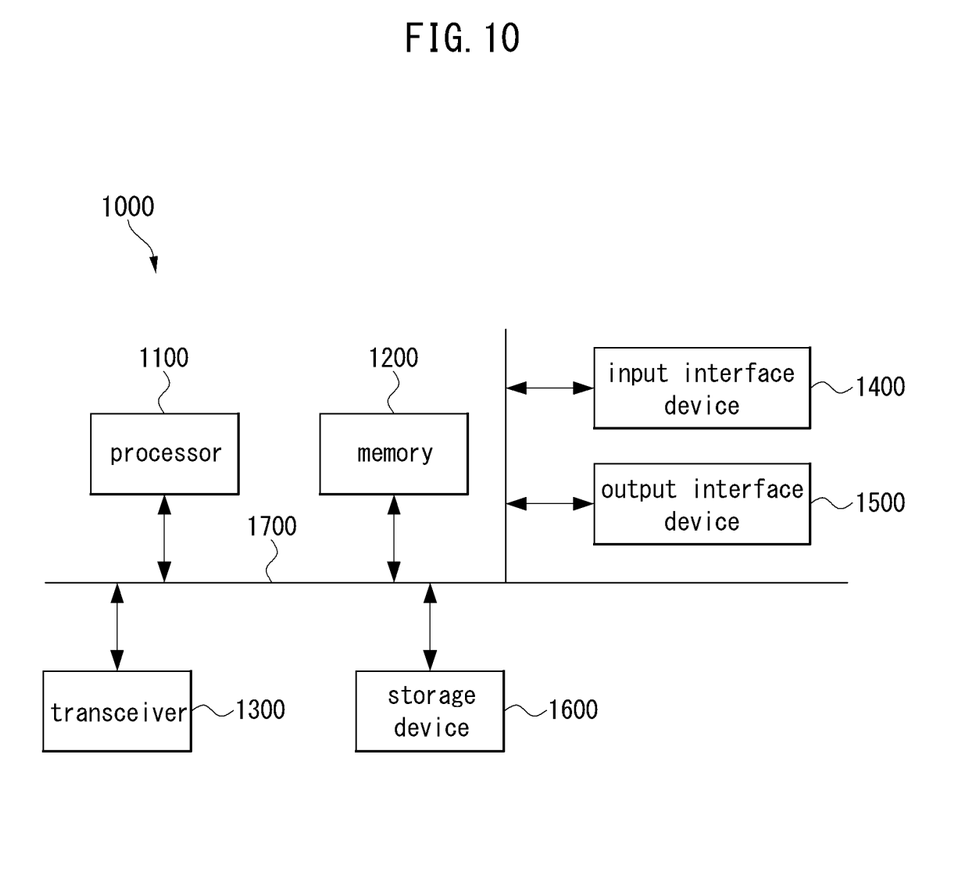
FIG. 10 is a schematic block diagram illustrating a Merkle tree-based data management apparatus according to another embodiment of the present disclosure.
Figure 11:
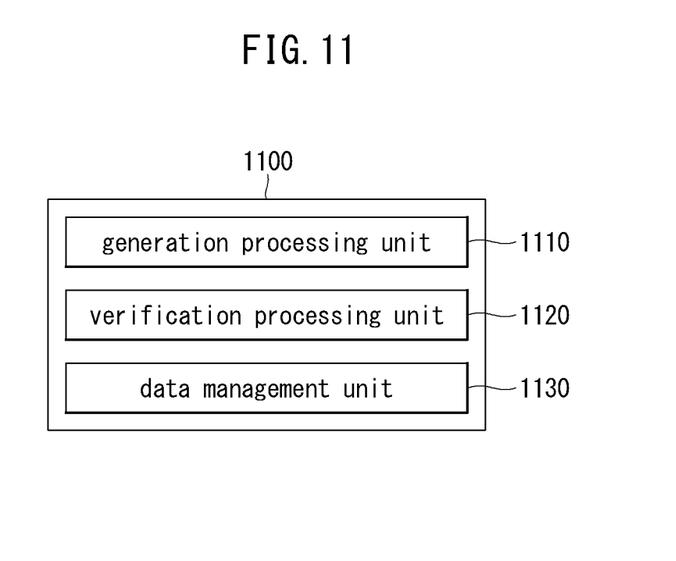
FIG. 11 is a schematic diagram illustrating a configuration of a software module that can be employed in the data management apparatus of FIG. 10.

FIG. 10 is a schematic block diagram illustrating a Merkle tree-based data management apparatus according to another embodiment of the present disclosure. FIG. 11 is a schematic diagram illustrating a configuration of a software module that can be employed in the data management apparatus of FIG. 10.

With reference to FIG. 10, the data management apparatus 1000 may include at least one processor 1100 implementing the Merkle tree-based data management method.

The data management apparatus 1000 may also be configured to further include a memory 1200, a transceiver 1300, an input interface device 1400, an output interface device 1500, a storage device 1600, or a combination thereof. Each component included in the data management apparatus 1000 may be connected via a bus 1700 to communicate with each other.

In addition, the components included in the data management apparatus 1000 may be connected through individual interfaces or buses centered on the processor 1100 instead of the common bus 1700. For example, the processor 1100 may be connected to at least one of the memory 1200, the transceiver 1300, the input interface device 1140, the output interface device 1500, and the storage device 1600 through a dedicated interface.

The processor 1100 may refer to a central processing unit (CPU), a graphics processing unit (GPU), or a dedicated processor on which the methods according to embodiments of the present disclosure are performed.

Each of the memory 1200 and the storage device 1600 may be configured with at least one of a volatile storage medium and a non-volatile storage medium. For example, the memory 1200 may be configured as at least one of read-only memory (ROM) and random access memory (RAM).

The transceiver 1300 may include a sub-communication system for performing communication with an external user terminal, a communication terminal, a Merkle tree generator, and the like. The sub-communication system may be configured to support a wired and/or wireless communication protocol.

The input interface device 1400 may include an input signal processing unit that maps, to a pre-stored instruction, or processes a signal input through at least one input means selected among input means such as a keyboard, a microphone, a touch pad, and a touch screen.

The output interface device 1500 may include an output signal processing unit mapping, to a prestored signal form or level, or processing a signal output under the control of the processor 1100 and at least one output means outputting a signal or information in the form of vibration or light according to a signal of the output signal processing unit. The at least one output means may include at least one selected among output means such as a speaker, a display device, a printer, an optical output device, and a vibration output device.

The processor 1100 may execute program commands stored in at least one of the memory 1200 and the storage device 1600. That is, when the processor 1100 is running, the program commands mounted on the processor 1100 may include a generation processing unit 1110, a verification processing unit 1120, and a data management unit 1130 as shown in FIG. 3. The program commands may be in the form of software modules.

Figure 12:
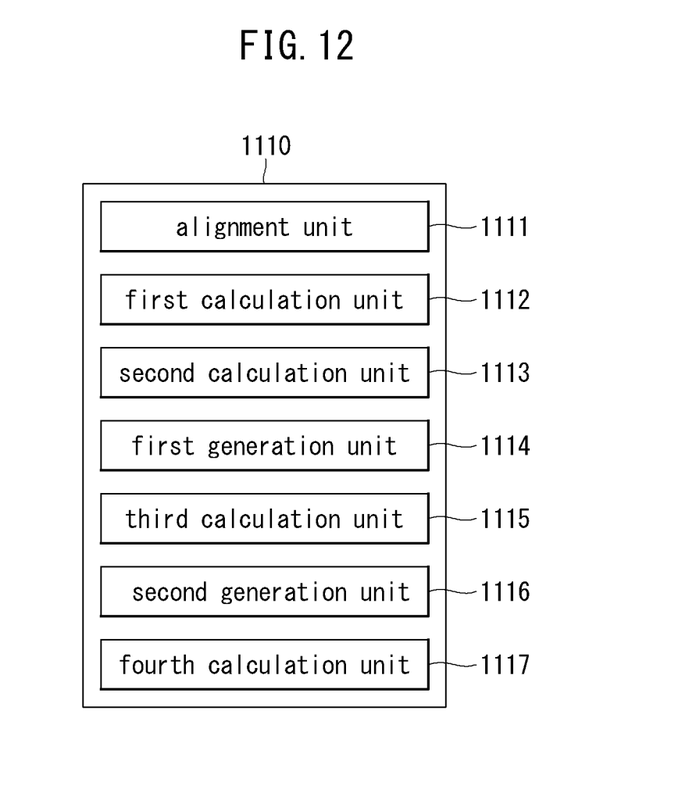
FIG. 12 is a block diagram illustrating a configuration that can be employed in the generation processing unit of the software module of FIG. 11.

FIG. 12 is a block diagram illustrating a configuration that can be employed in the generation processing unit of the software module of FIG. 11.

With reference to FIG. 12, the generation processing unit 1110 may include an alignment unit 1111, a first calculation unit 1112, a second calculation unit 1113, a first generation unit 1114, a third calculation unit 1115, a second generation unit 1116, and a fourth calculation unit 1117.

The alignment unit 1111 may align previously prepared or input data in a two-dimensional square matrix. The two-dimensional square matrix may be expressed as $2^n \times 2^n$. Here, n may be any natural number equal to or greater than 1.

The first calculation unit 1112 may calculate a hash value of data of each node of the two-dimensional square matrix.

The second calculation unit 1113 may calculate hash values of each row of the two-dimensional square matrix. The first generation unit 1114 may generate an additional column with nodes having hash values of each row.

The third calculation unit 1115 may calculate hash values of each column of the two-dimensional square matrix. The second generation unit 1116 may generate an additional row with nodes having hash values of each column.

The fourth calculation unit 1117 may calculate the Merkle root by concatenating hash values of data of the nodes in the additional column with hash values of data of the nodes in the additional row.

Figure 13:
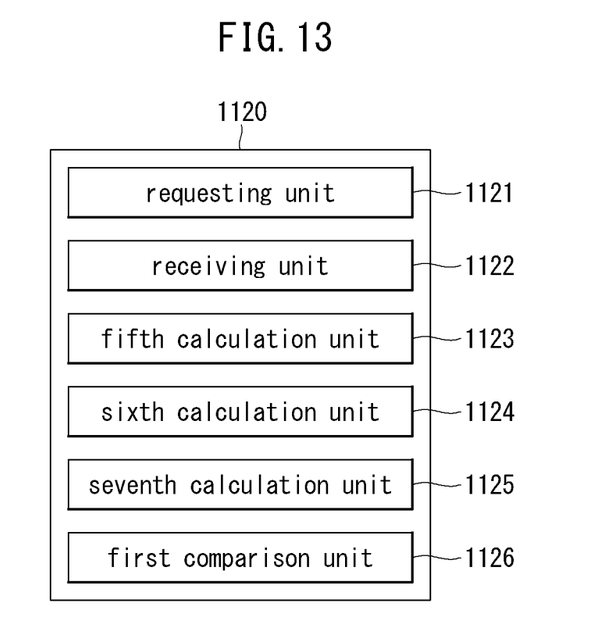
FIG. 13 is a block diagram illustrating a configuration that can be employed in the verification processing unit of the software module of FIG. 11.

FIG. 13 is a block diagram illustrating a configuration that can be employed in the verification processing unit of the software module of FIG. 11.

With reference to FIG. 13, the verification processing unit 1120 may include a requesting unit 1121, a receiving unit 1122, a fifth calculation unit 1123, a sixth calculation unit 1124, a seventh calculation unit 1125, and a first comparison unit 1126.

The requesting unit 1121 may request the Merkle path and the original Merkle root for the verification target data from the Merkle tree generator through a wired or wireless communication network. The receiving unit 1122 may receive the Merkle path and the original Merkle root from the Merkle tree generator.

The fifth calculation unit 1123 may calculate a hash value for the verification target data.

The sixth calculation unit 1124 may calculate a hash value of the data of the corresponding node in the additional column, i.e., the additional column node, and the hash value of the data of the corresponding node in the additional row, i.e., the additional row node by concatenating Merkle paths that are hash values of the remaining nodes in the corresponding row and the corresponding column of the two-dimensional square matrix in which the hash value of the verification target data is located, respectively.

The seventh calculation unit 1125 may calculate the Merkle root by concatenating the hash value of the data of the additional column node and the Merkle paths that are hash values of the data located in the remaining nodes of the additional column and concatenating the hash value of the data of the additional row node and the Merkle paths that are hash values of the data located in the remaining nodes of the additional row.

The first comparison unit 1126 may compare the calculated Merkle root with the original Merkle root. According to the comparison result, the verification processing unit 1120 may verify the integrity of the verification target data.

Figure 14:
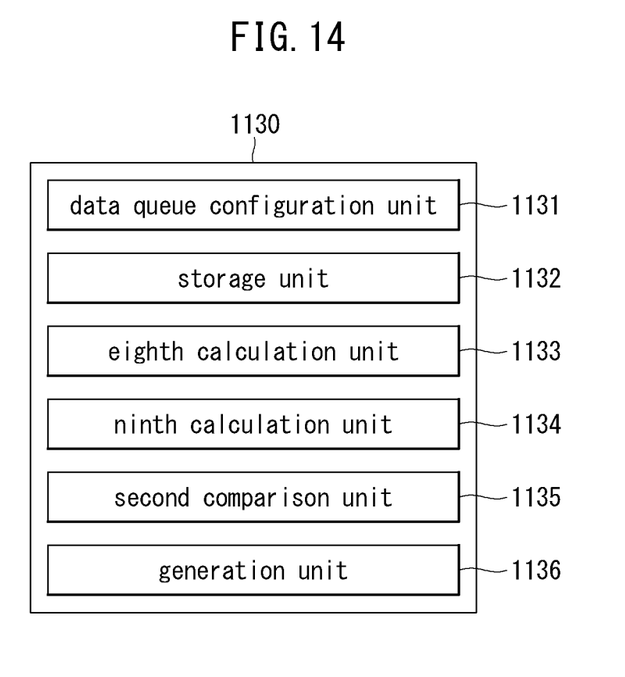
FIG. 14 is a block diagram illustrating a configuration that can be employed in the data management unit of the software module of FIG. 11.

FIG. 14 is a block diagram illustrating a configuration that can be employed in the data management unit of the software module of FIG. 11.

With reference to FIG. 14, the data management unit 1130 may include a data queue configuration unit 1131, a storage unit 1132, an eighth calculation unit 1133, a ninth calculation unit 1134, a second comparison unit 1135, and a third generation unit 1136.

The data queue configuration unit 1131 may configure or prepare the Merkle tree generation queue in the form of a two-dimensional square matrix, e.g., $2^n \times 2^n$. Here, n is a natural number equal to or greater than 1. The storage unit 1132 may store consecutively incoming data into the data queue in order.

The eighth calculation unit 1133 may calculate hash values of data stored in the data queue. The ninth calculation unit 1134 may calculate the value of the last M bits (M is an arbitrary natural number equal to or greater than 2) of each of the hash values.

In the course of filling the Merkle tree generation queue with the pre-calculated M-bit result value using the data index matching method, when two consecutive result values are duplicated, the second comparison unit 1135 may process to fill one of the preceding result value and the succeeding result value into the next Merkle tree generation queue.

In the course of filling the calculated M-bit result value into the Merkle tree generation queue, when the Merkle tree generation queue is completely filled, the third generation unit 1136 may generate the Merkle tree with the completely filled Merkle tree generation queue.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A Merkle tree-based data management method comprising:
   aligning data into two-dimensional square matrix;
   calculating hash values of each node of the two-dimensional square matrix;
   calculating hash values of each row of the two-dimensional square matrix;
   generating an additional column with nodes having the hash values of each row;
   calculating hash values of each column of the two-dimensional square matrix;
   generating an additional row with nodes having the hash values of each column;
   obtaining a Merkle path and an original Merkle root for verification target data, the Merkle path representing a pre-calculated hash value of a specific node among the nodes of the two-dimensional square matrix;
   calculating hash values for the verification target data aligned in the two-dimensional square matrix;
   calculating each hash value of a specific column in an additional row and a specific row in an additional column by concatenating a hash value of an arbitrary node of the two-dimensional square matrix and Merkle path values of remaining nodes of the specific row and the specific column including the arbitrary node;
   calculating a Merkle root by concatenating a hash value of a specific column of the additional row with Merkle path values of the remaining nodes of the additional row and concatenating the hash value of the specific row of the additional column with Merkle path values of the remaining nodes of the additional column; and
   verifying integrity of the verification target data by comparing the calculated Merkle root with the original Merkle root.

2. The method of claim 1, further comprising:
   calculating a value of predetermined last bits of the hash value pre-calculated for the data;
   filling the calculated result value of the predetermined last bits into a Merkle tree generation queue; and
   generating a Merkle tree upon the Merkle tree generation queue being completely filled.

3. The method of claim 2, further comprising verifying integrity of the verification target data using the Merkle tree.

4. The method of claim 1, further comprising:
   calculating a value of predetermined last bits of the hash value pre-calculated for the data;
   filling the calculated result value of the predetermined last bits into a Merkle tree generation queue; and
   generating a Merkle tree upon the Merkle tree generation queue being completely filled.

5. The method of claim 4, further comprising processing, in response to a duplicate of the result value of the predetermined last bits while filling the calculated result value of the predetermined last bits into the Merkle tree generation queue in a data index matching method, to fill a corresponding value into a next Merkle tree generation queue.

6. The method of claim 1, wherein obtaining the Merkle path and the original Merkle root comprises:
   requesting the Merkle path and the original Merkle root for the verification target data from a Merkle tree generator; and
   receiving the Merkle path and the original Merkle root form the Merkle tree generator.

7. The method of claim 1, further comprising generating the two-dimensional square matrix before calculating the hash value,
   wherein generating the two-dimensional square matrix comprises:
   aligning the verification target data in a basic form of the two-dimensional square matrix;
   calculating hash values of each node of the two-dimensional square matrix;
   calculating hash values of each row of the two-dimensional square matrix;
   generating an additional column with nodes having the hash values of each row;
   calculating hash values of each column of the two-dimensional square matrix; and
   generating an additional row with nodes having the hash values of each column.

8. The method of claim 1, further comprising:
   configuring a Merkle tree generation queue as 2n×2n;
   storing consecutively incoming data into a data queue in order;
   calculating hash values of data aligned in a basic form of a two-dimensional square matrix in the data queue;
   calculating a value of predetermined last bits of each of the hash values;
   filling the calculated result value of the predetermined last bits into the Merkle tree generation queue; and
   generating a Merkle tree upon the Merkle tree generation que being completely filled.

9. The method of claim 8, further comprising processing, in response to a duplicate of the result value of the predetermined last bits while filling the calculated result value of the predetermined last bits into the Merkle tree generation queue in a data index matching method, to fill a corresponding value into a next Merkle tree generation queue.

10. The method of claim 8, further comprising verifying integrity of the verification target data using the Merkle tree.

11. A data management apparatus comprising:
    at least one processor performing Merkle tree-based data management with a program or at least one instruction stored in a memory,
    wherein the processor is configured to perform aligning data into two-dimensional square matrix, calculating hash values of each node of the two-dimensional square matrix, calculating hash values of each row of the two-dimensional square matrix, generating an additional column with nodes having the hash values of each row, calculating hash values of each column of the two-dimensional square matrix, generating an additional row with nodes having the hash values of each column, obtaining a Merkle path and an original Merkle root for verification target data, the Merkle path representing a pre-calculated hash value of a specific node among the nodes of the two-dimensional square matrix, calculating hash values for the verification target data aligned in the two-dimensional square matrix, calculating each hash value of a specific column in an additional row and a specific row in an additional column by concatenating a hash value of an arbitrary node of the two-dimensional square matrix and Merkle path values of remaining nodes of the specific row and the specific column including the arbitrary node, calculating a Merkle root by concatenating a hash value of a specific column of the additional row with Merkle path values of the remaining nodes of the additional row and concatenating the hash value of the specific row of the additional column with Merkle path values of the remaining nodes of the additional column, and verifying integrity of the verification target data by comparing the calculated Merkle root with the original Merkle root.

12. The apparatus of claim 11, wherein the processor is further configured to perform calculating a value of predetermined last bits of the hash value pre-calculated for the data, filling the calculated result value of the predetermined last bits into a Merkle tree generation queue, and generating a Merkle tree upon the Merkle tree generation queue being completely filled.

13. The apparatus of claim 11, wherein the processor is further configured to perform verifying integrity of the verification target data using the Merkle tree.

* * * * *